US010821560B2

(12) United States Patent
Garza et al.

(10) Patent No.: US 10,821,560 B2
(45) Date of Patent: Nov. 3, 2020

(54) ROLLER FOR INTERNAL PIPE WELDER

(71) Applicant: CRC-EVANS PIPELINE INTERNATIONAL, INC., Houston, TX (US)

(72) Inventors: Gustavo Garza, Houston, TX (US); John Pearson, Houston, TX (US); Allen Noble, Houston, TX (US); Joseph Tullis, Houston, TX (US); David Dietlin, Tulsa, OK (US); Tony Massey, Tulsa, OK (US); Donald Kramp, Tulsa, OK (US); Leslie Atwell, Tulsa, OK (US); Travis Sapp, Tulsa, OK (US); Brian Fulton, Tulsa, OK (US); Paul Matthews, Tulsa, OK (US); Eric Pameticky, Tulsa, OK (US); Dennis Kinney, Tulsa, OK (US); David Robb, Tulsa, OK (US)

(73) Assignee: CRC-EVANS PIPELINE INTERNATIONAL, INC., Houston, TX (US)

( * ) Notice: Subject to any disclaimer, the term of this patent is extended or adjusted under 35 U.S.C. 154(b) by 0 days.

(21) Appl. No.: 15/165,029

(22) Filed: May 26, 2016

(65) Prior Publication Data

US 2017/0341189 A1 Nov. 30, 2017

(51) Int. Cl.
*F16L 55/18* (2006.01)
*B23B 5/14* (2006.01)
(Continued)

(52) U.S. Cl.
CPC ...... *B23K 37/0276* (2013.01); *B23K 37/0282* (2013.01); *F16L 55/48* (2013.01);
(Continued)

(58) Field of Classification Search
CPC .......... B24D 5/40; B24B 19/02; B23D 21/14; B23D 79/023; B23K 37/0531;
(Continued)

(56) References Cited

U.S. PATENT DOCUMENTS 3,044,431 A * 7/1962 Cummings ........ B23K 37/0531
228/44.5
3,699,635 A * 10/1972 Bradley ............. B23K 37/0531
228/44.5
(Continued)

*Primary Examiner* — Tan Le
(74) *Attorney, Agent, or Firm* — Kofi A. Schulterbrandt; Michael P. Leary

(57) ABSTRACT

Disclosed herein is a rotational roller apparatus for use with a pipeline unit. The pipeline unit is received in a pipeline for welding and/or inspection. The rotational roller is attached to and is able to support at least a portion of the weight of the pipeline unit. The rotational roller unit also includes an extension member and a reduced friction base. The reduced friction base is attached to an end of the extension member so that the rotational roller has a retracted and an extended configuration. In the extended configuration, the reduced friction base contacts an interior of the pipeline and supports at least a portion of the weight of the pipeline unit and thereby allows the unit to be rotated about a longitudinal axis within the pipeline.

20 Claims, 6 Drawing Sheets

(51) Int. Cl.
*F16B 19/00* (2006.01)
*F16M 13/02* (2006.01)
*B23D 79/00* (2006.01)
*B23K 37/02* (2006.01)
*F16L 55/48* (2006.01)
*F16L 101/30* (2006.01)
*B23D 21/14* (2006.01)
*E21B 29/00* (2006.01)
*B23D 79/02* (2006.01)

(52) U.S. Cl.
CPC ............ *B23D 21/14* (2013.01); *B23D 79/023* (2013.01); *E21B 29/005* (2013.01); *F16L 55/18* (2013.01); *F16L 2101/30* (2013.01)

(58) Field of Classification Search
CPC .. B23K 37/0276; B23K 31/125; F16M 55/00; F16M 11/26; F16M 11/425; F16M 13/02; F16L 2101/30; F16L 55/18; A47B 96/06; F16B 19/00; G01M 3/00
USPC .... 248/542, 430; 228/44.5, 45, 49.3, 8, 212; 73/609, 614, 622, 625, 40.5 R; 269/47, 269/48.1
See application file for complete search history.

(56) References Cited

U.S. PATENT DOCUMENTS

| | | | | |
|---|---|---|---|---|
| 3,859,877 | A * | 1/1975 | Sherer | B23B 29/02 82/100 |
| 3,868,847 | A * | 3/1975 | Gunkel | G01N 29/22 73/609 |
| 3,921,533 | A * | 11/1975 | Szenasi | B65G 51/06 406/185 |
| 4,582,241 | A * | 4/1986 | Johnson | B23K 37/0531 228/49.3 |
| 5,816,475 | A * | 10/1998 | Brookhouse | B23K 37/0531 228/212 |
| 9,321,134 | B2 * | 4/2016 | de Lange | B23K 37/0531 |

* cited by examiner

ROLLER FOR INTERNAL PIPE WELDER

FIELD OF THE INVENTION

The present invention relates to equipment for pipeline construction and/or maintenance technology.

BACKGROUND OF THE INVENTION

During pipeline construction or maintenance certain equipment is inserted into the pipeline (e.g., for welding or inspection purposes). These units are positioned inside the pipe to weld or inspect that pipe. In addition, these units can travel short or long distances into a pipeline to do their work. As the units travel down the pipeline longitudinally, they can sometimes experience an undesirable rotation about the longitudinal axis of the pipe. In other words, at the beginning of the unit's travel its rotational position (e.g., 12:00 o'clock) is noted. Sometime later after some longitudinal travel within the pipeline its rotational orientation becomes offset (e.g., 12:10 o'clock). Units can have a particular/preferred performance orientation so that a unit works only, better, or best in a particular rotational orientation. Typically, these weld or inspection units include wheel systems designed to facilitate longitudinal travel in the pipe. The wheels of these wheel systems are typically oriented for rollably supporting the unit in a longitudinal direction (i.e., wheels axes perpendicular to a longitudinal pipeline centerline). This wheel orientation is typically perpendicular to the orientation the wheels would need to have in order to facilitate rotational (i.e., about the pipe longitudinal axis) rolling (i.e., from 12:10 o'clock back to 12:00 o'clock). In fact, these longitudinal travel wheel systems (in contact with a pipe interior surface) for facilitating longitudinal movement would normally serve to frictionally discourage/inhibit or even prevent rotation of the unit about the longitudinal axis. Furthermore, these welding or inspection units are very heavy so as to create a large amount of frictional force opposing any effort to urge the unit rotationally back into a more desired orientation or positioning. It would therefore be desirable to provide a system that reduced the force and energy necessary to reposition a unit within a pipe to a desirable rotational orientation. Specifically, it would be desirable to reduce the force necessary to rotate a unit so that an operator applying a predetermined amount of torque to the unit could rotationally reorient the unit (e.g., manually) about the longitudinal center line of the pipe.

SUMMARY OF THE INVENTION

A pipeline unit may include a first longitudinal roller support system that rollingly supports the pipeline unit as it travels longitudinally within the pipe. The pipeline unit may also support a second rotational roller system which transfers at least a portion of the weight of the pipeline unit to the rotational roller or load support mechanism and which facilitates rotational positioning/repositioning within the pipeline. This second rotational roller system may comprise a single unit or multiple similar units position longitudinally for bearing the weight of the pipeline unit. The rotational roller load support mechanism includes a low friction base portion that allows the unit to be supportably rotated on the roller system via the base portion. The base portion may include a friction reduction mechanism such as in-line wheels. Specifically, the invention includes a roller system for supporting the rotational repositioning of a pipeline unit against the weight of the pipeline unit. The pipeline unit includes a main frame to which its components are secured. The roller system includes at least one wheel including a rotational axis, the axis could be generally parallel to a longitudinal center line of the unit. While a wheel can be used as a friction reducing base, any low friction mechanism may also be utilized. When the low friction base member utilizes a wheel, a wheel frame can be provided for supporting the wheel and allowing the wheel to rotate about an axis. An extension member is also provided with the present invention roller that extends from the pipeline unit toward and in contact with an interior of the pipeline to transfer the load of the pipeline unit to the roller system and then to the pipeline interior. The extension portion includes a first member connected to the main frame and a second member connected to the wheel frame. The second portion is supported by and selectively extends (e.g., telescopically) relative to the first portion to cause at least a portion of the weight of the pipeline unit to be borne by the wheel.

BRIEF DESCRIPTION OF THE DRAWINGS

The present invention in its several aspects and embodiments solves the problems discussed above and significantly advances the technology of pipeline inspection and welding. The present invention can become more fully understood from the detailed description and the accompanying drawings, wherein.

Throughout this specification and figures like reference numbers identify like elements.

DETAILED DESCRIPTION OF THE INVENTION

Disclosed herein is a rotational roller system for transferring a portion of the weight of a pipeline unit to a selectively retractable reduced friction member to reduce the energy necessary to rotate the pipeline unit within a pipeline when the reduced friction member is in contact with the pipeline interior.

Figure 1:
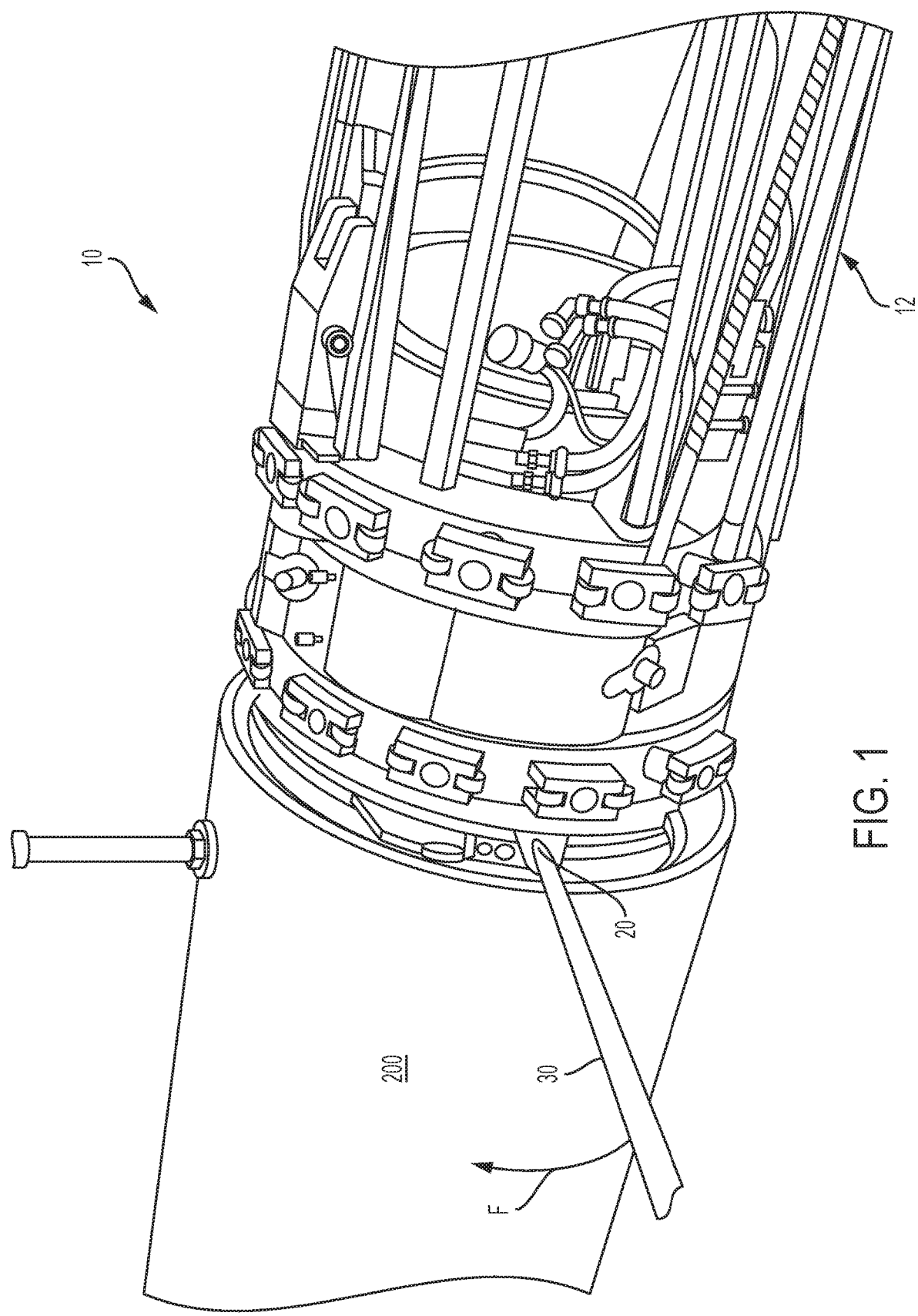
FIG. 1 shows a perspective view of a pipeline unit partially inserted into a pipeline.

FIG. 1 shows a side perspective view of a pipeline unit 10 partially inserted into a pipeline 200. Pipeline unit 10 is configured to be inserted into a pipeline. After insertion into a pipeline, pipeline unit 10 may be used for the purpose of inspection (e.g., inspection of internal surfaces or weld joints) and/or welding (e.g., during pipeline construction or maintenance). As seen in FIG. 1, a rear end of the pipeline unit 10 is not shown in this figure as it is concealed by pipeline unit 200. On the other hand, nose end 12 of the pipeline unit 10 is visible and extends out of the end of pipeline 200. A lever receptacle 20 is located on a peripheral side of pipeline unit 10 for receiving an end of a lever 30. When lever 30 is received in lever receptacle 20, an operator may apply a positive/negative rotational force F thereto in order to rotate pipeline unit 10 relative to pipeline 200 about a longitudinal central axis of the pipeline and the pipeline unit 10.

Figure 2:
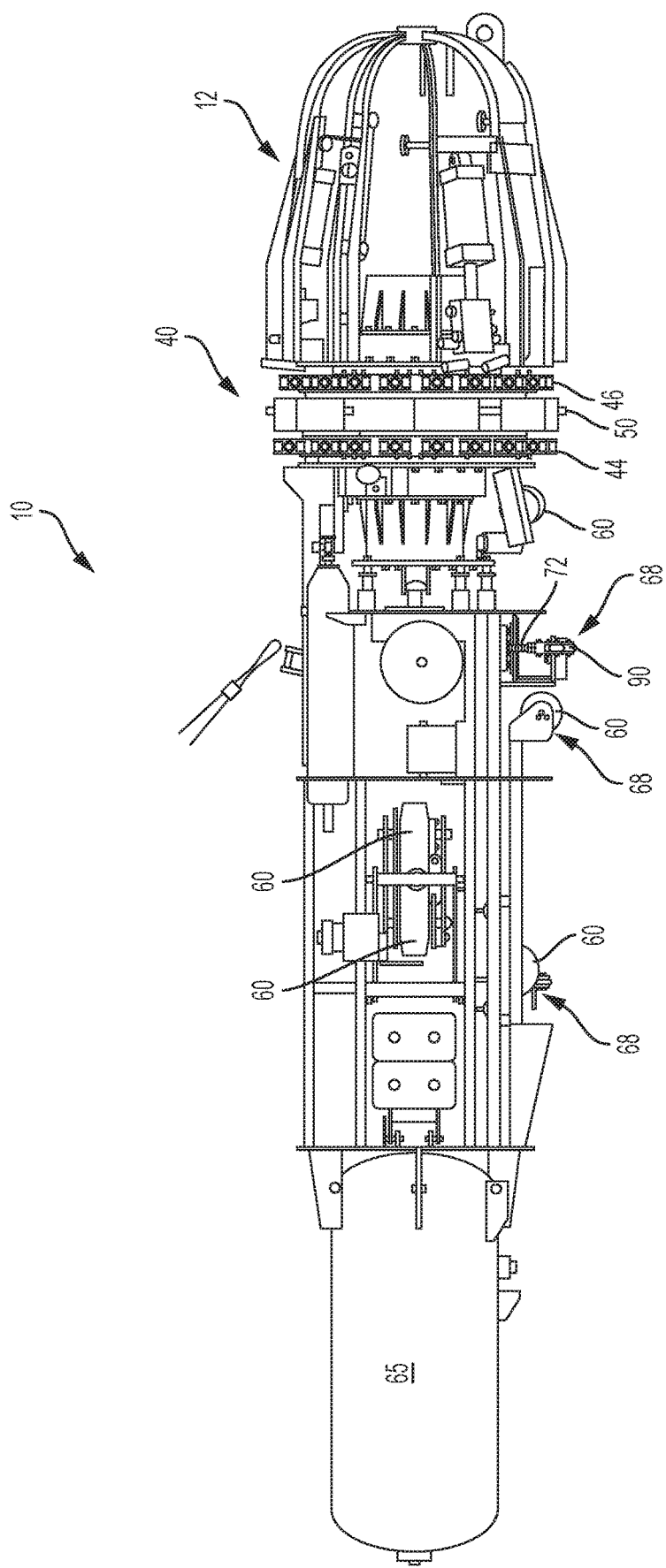
FIG. 2 shows a side view of the pipeline unit of FIG. 1 having a rotational roller of the present invention attached thereto.

FIG. 2 shows a side view of pipeline unit 10 and forward and rear low or reduced friction bases 68 attached thereto and extending therefrom. Rear base 68 is shown in a retracted configuration while forward base 68 is shown in an extended (i.e., load bearing) configuration. FIG. 2 also shows that pipeline unit 10 also optionally includes a clamping portion including clamps 44 and 46 for engaging a pipe interior surface and a weld or inspection portion 40. A plurality of wheels 60 are set at a general radial periphery of pipeline unit 10. Wheels 60 are for supporting the pipeline unit 10 as it rolls longitudinally within pipeline 200. Specifically, wheels 60 are for reducing or minimizing a frictional contact between pipeline unit 10 and the interior of pipeline 200 within which pipeline unit 10 is traveling longitudinally. In a longitudinal wheel system, various ones of wheels 60 may be powered or be free rolling. Furthermore, a nose 12 of pipeline unit 10 is tapered in shape to facilitate insertion of pipeline unit 10 into a pipeline or pipeline segment (e.g., the next pipeline segment to be added to or welded to pipeline 200 during pipeline construction). FIG. 2 also shows an air supply tank 65 which serves as a reservoir of pneumatic energy/fuel for use in various operations of pipeline unit 10 (e.g., wheels 60 propulsion, instrumentation, clamp extension, etc.).

Figure 3:
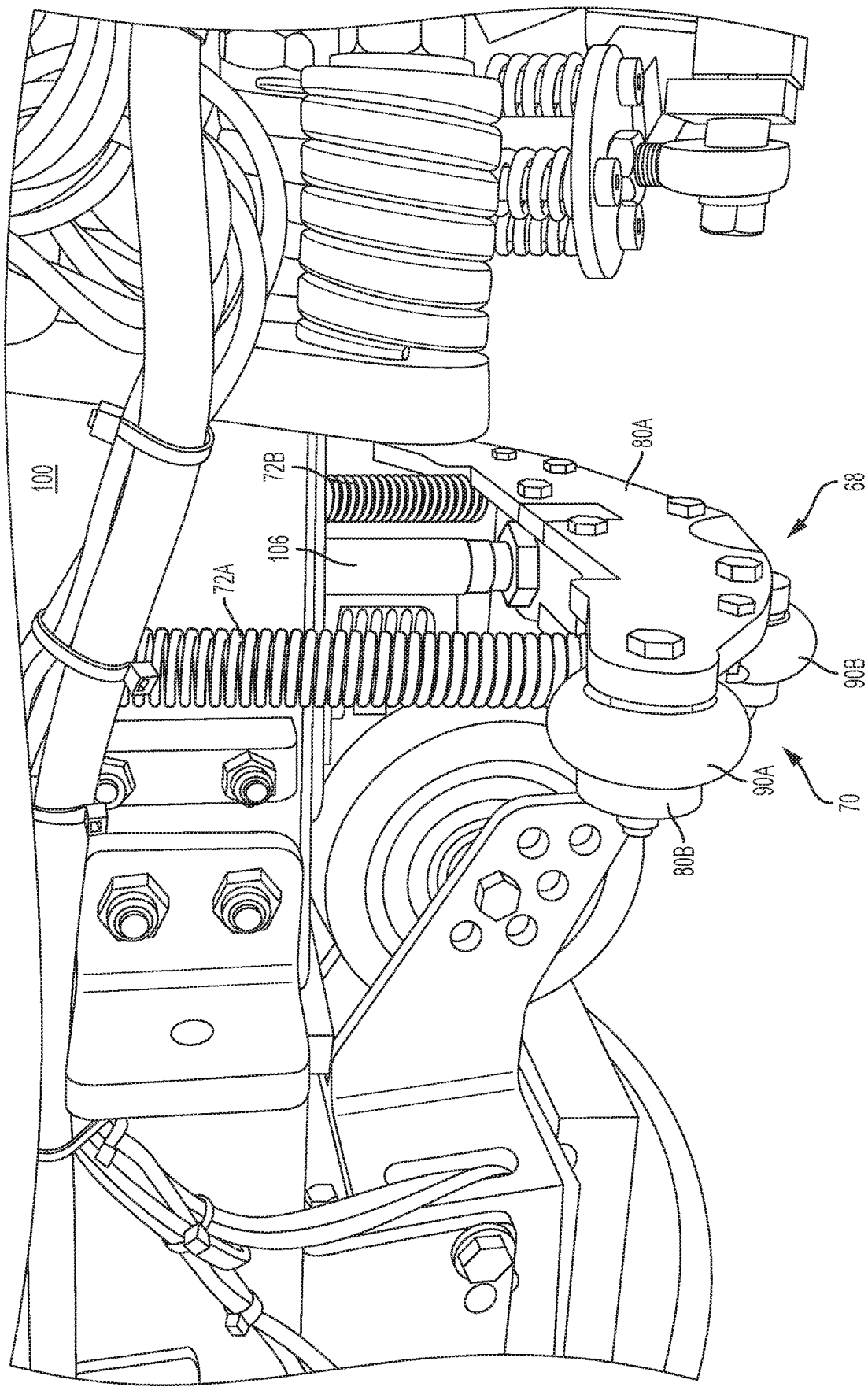
FIG. 3 shows a front perspective view of the base portion of the rotational roller of the FIG. 2.
Figure 4:
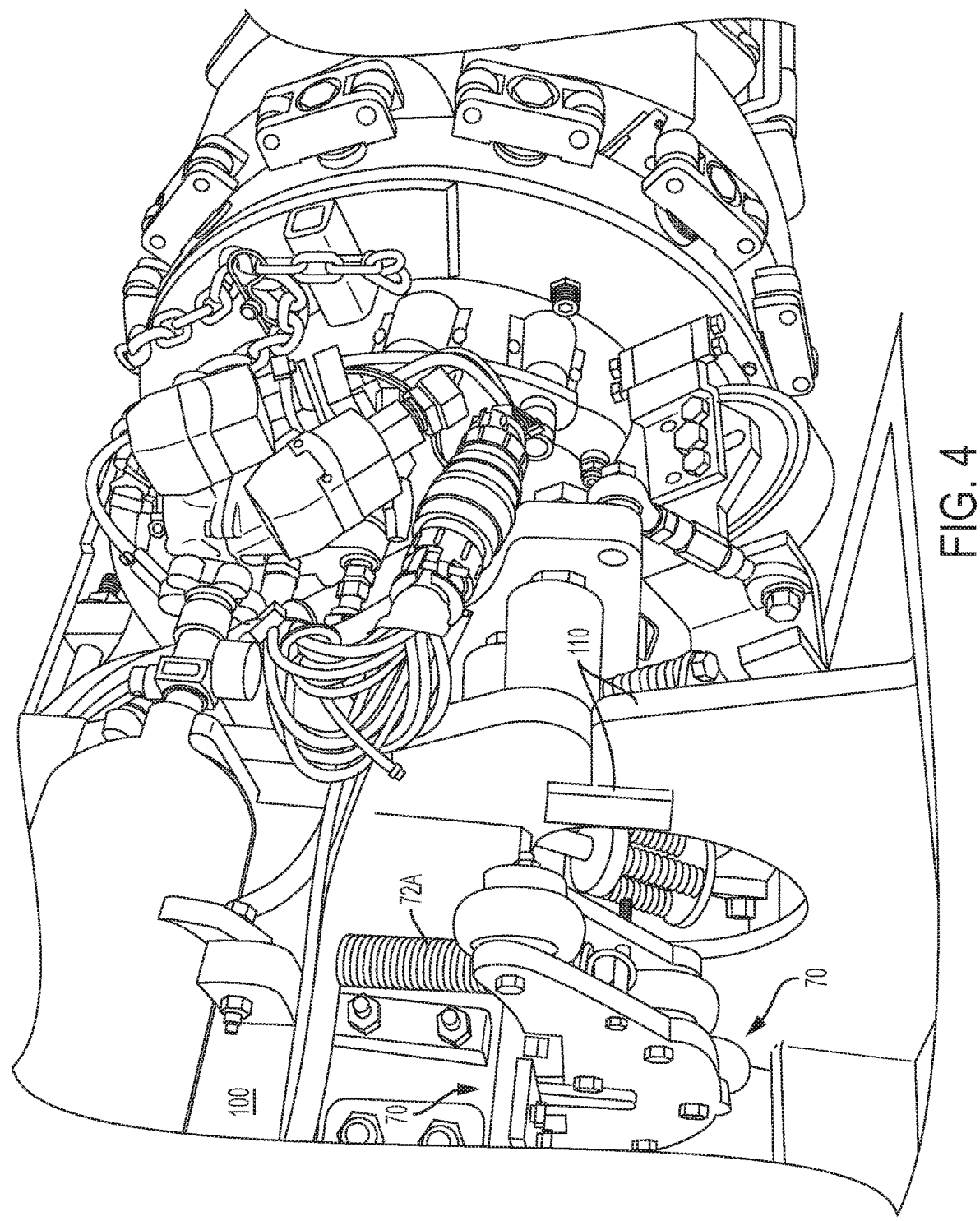
FIG. 4 shows a rear perspective view of a base portion of the rotational roller of the FIG. 2.
Figure 5:
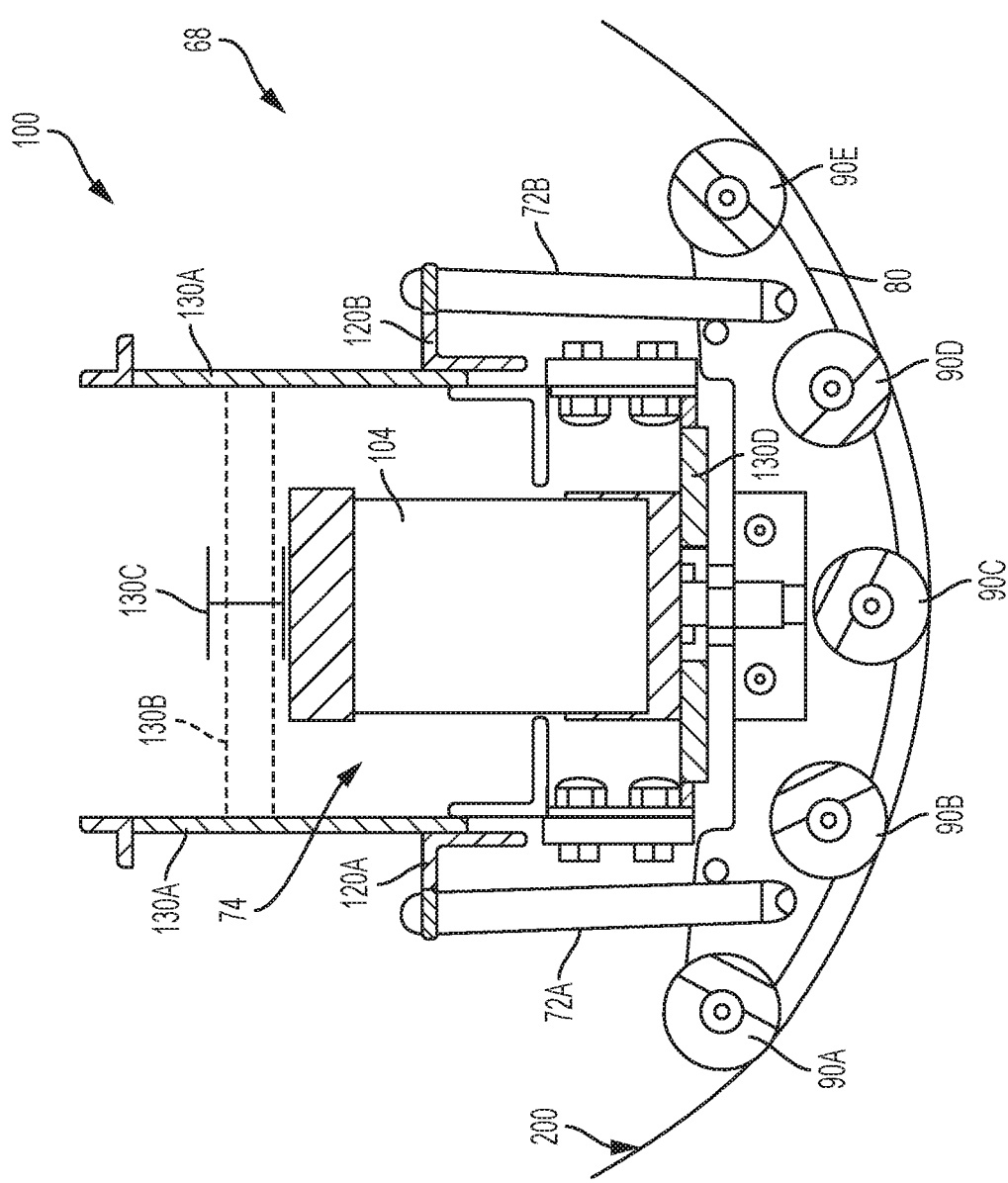
FIG. 5 shows cross-sectional view of the rotational roller of FIG. 2 in a retracted configuration.
Figure 6:
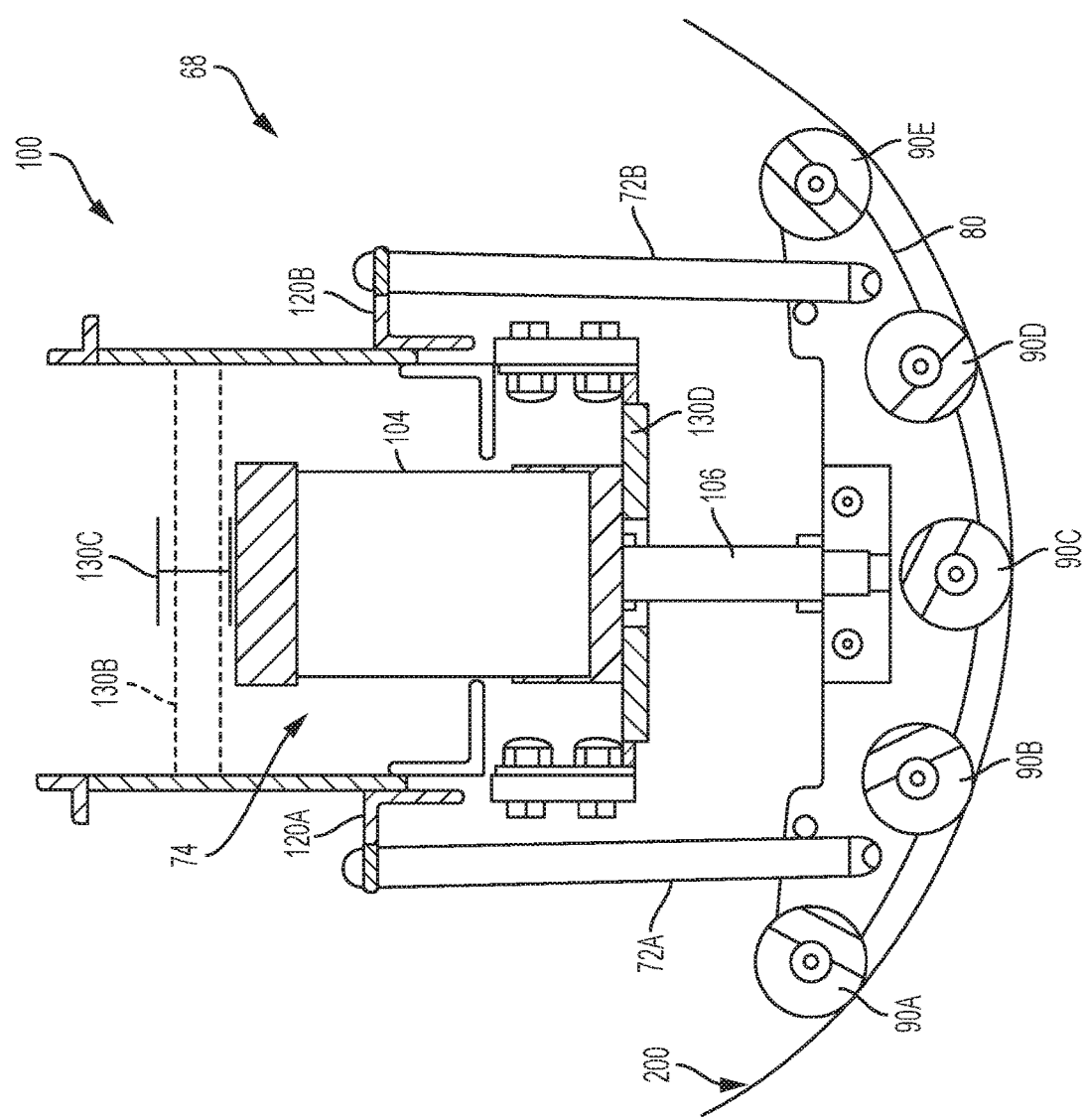
FIG. 6 shows cross-sectional view of the rotational roller of FIG. 2 in an extended configuration.

FIG. 3-6 show the rotational roller system 68 connected to the pipeline unit 10. Specifically, FIGS. 3 and 4 respectively show a partial front perspective view of the rotational roller system 68 in an extended configuration and a partial rear perspective view in a retracted configuration. Both configurations 68 are shown integrated with pipeline unit 10. FIGS. 5 and 6 show simplified cross sectional views of the rotational roller system 68 and a main frame 100 of pipeline unit 10 to which the rotational roller system 68 is connected and by which the rotational roller system 68 supports the weight of pipeline unit 10.

Main frame structure 100 includes main frame support members 130A-D. Members 130 include beam side walls 130A, lateral beam connectors 130B, a reaction force beam 130C, and bottom beam member 130D. Side walls 130A support angle support members 120A and 120B to which upper ends of springs 72A and 72B are connected and through which those springs 72A, 72B transfer their retracting forces to wheel frame 70.

FIGS. 3 and 4 also show a lower portion of the rotational roller system. A wheel frame 70 includes a plurality of wheels 90A-90E. Wheel frame 70 also includes a first plate 80A and a second plate 80B that sandwich in-line wheels 90A-90E. A series of fasteners and bearings secure wheels 90A-90E in plates 80A and 80B. An extending member 74 includes a first portion 104 and a second portion 106. First portion 104 is slidably connected to second portion 106. Specifically, at least a portion of second portion 106 can be forced away from or drawn toward first portion 104. In one embodiment, first portion 104 is a hydraulic or pneumatic cylinder that slidably or telescopically receives second portion 106 which is a piston. Alternatively, a screw or gear mechanism may be utilized (e.g., with an electric motor). Furthermore, an electronic controller may be used to control the supply of fluid and thus control piston extension and retraction. The cylinder of first portion 104 is connected to main frame 100. For example, a bottom end of first portion 104 can be connected to reaction force beam 130D. Alternatively, a different portion of first portion 104 could be connected to a portion of main frame 130 so long as that connection allows for transfer of load from the frame to first part 104. In operation, second portion 106 is forcibly extendable away from first portion 104 such that extending member 74 can exist in an extended configuration (shown in FIGS. 3 and 6) and a retracted configuration (shown in FIGS. 4 and 5). Furthermore, a manual or electronic controller may be used to turn the supply fluid on and off.

FIGS. 3-6 also show biasing members or springs 72A and 72B. Springs 72A and 72B provide a retracting force for urging wheel frame 70 toward the retracted configuration of FIGS. 4 and 5. FIG. 4 shows a pedestal structure 110 for supporting the pipeline unit 10 when the pipeline unit 10 is not inserted in a pipeline 200.

Reaction force beam 130D provides the reaction force which transfers the load of pipeline unit 10 to rotational roller system 68. Specifically, since reaction force beam 130D is a part of main frame structure 100, when extending member 74 extends, load/weight is transferred from beam 130D of pipeline unit 10 to first portion or cylinder 104 then to piston or second portion 106 then to wheel frame 70 and then to an interior surface of pipeline 200.

When extending member 74 is actuated via a pneumatic mechanism, an operator simply operates a manual valve that supplies working fluid (e.g., air or another gas) to the system. Specifically, a valved gas/air supply line may supply gas between air tank 65 and the first cylinder portion 104 of the rotational roller system. An operator controls a valve so that gas introduced into cylinder 104 forces piston 106 radially outward toward a pipe interior surface until wheel frame 70 is in contact with the pipe interior surface. Piston 106 extends after contact with the pipe interior surface bearing the load of pipeline unit 10 until pipeline unit 10 is raised about ¼ to about ½ inches off the pipe interior surface. In the off or retract configuration, air pressure from air tank 65 is stopped and the air pressure in the cylinder 104 is allowed to vent to the atmosphere. Biasing members or springs 72 may then return wheel frame 70 to its retracted position. Alternatively, air pressure may also be used to forcibly retract the system.

When one roller system is used, longitudinal positioning of the roller system 68 on the pipeline unit 10 can be such that the roller system is at or near the center of gravity of pipeline unit 10. That single roller system 68 would then function as fulcrum so that when pipeline unit 10 is balanced on that fulcrum most, if not all, of the weight of pipeline unit 10 is borne by roller system 68. Positioning of the roller system near or in proximity to wheels 60 can also be beneficial as such positioning has the potential to minimize the load borne by wheels 60. As such, less load on wheels 60 means less friction via wheels 60 on pipeline interior to overcome while rotating pipeline unit 10 about the longitudinal axis. As also shown in FIG. 2, multiple roller systems may be utilized to further reduce rotational friction. FIG. 2 shows two roller systems 68 positioned to bear some of all of the weight of pipeline unit 10. Here, both roller systems 68 are positioned in proximity to wheels 60.

While embodiments have been disclosed here, other related innovative ideas are also contemplated therein. For example, one or multiple rotational roller systems 68 may be used for load transfer. These roller systems 68 may be positioned at various longitudinal position(s) along the length of the pipeline unit 10. Instead of pistons a screw type or other type of linear actuator may be utilized. Furthermore, power for energizing these various types of linear actuators may include AC or DC (e.g., batteries) electric power and electric motors for generating the necessary lifting forces.

The scope of this disclosure is to be broadly construed. It is intended that this disclosure disclose equivalents, means, systems and methods to achieve the devices, activities and mechanical actions disclosed herein. For each mechanical element, or mechanism, or method, or process disclosed, it is intended that this disclosure also encompass in its disclosure and teaches equivalents, means, systems and methods for practicing the many aspects, mechanisms and devices disclosed herein. Additionally, this disclosure regards a near-weld purge rig and its many aspects, features and elements. Such a near-weld purge rig can be dynamic in its use and operation, this disclosure is intended to encompass the equivalents, means, systems and methods of the use of the tool and its many aspects consistent with the description and spirit of the operations and functions disclosed herein. The claims of this application are likewise to be broadly construed.

The description of the inventions herein in their many embodiments is merely exemplary in nature and, thus, variations that do not depart from the gist of the invention are intended to be within the scope of the invention. Such variations are not to be regarded as a departure from the spirit and scope of the invention.

The invention claimed is:

1. A pipeline unit for conducting a construction or inspection operation within a pipeline comprising:
    a main frame;
    a first low friction member for engaging the pipe interior and supporting a weight of the pipeline unit on an interior pipeline surface as the pipeline unit travels longitudinally within the pipeline;
    a second low friction member for selectively engaging the pipe interior supporting a weight of the pipeline unit as the pipeline unit is rotated about the longitudinal axis of the pipeline;
    a extension member including a first member connected to the main frame and a second member connected to the second low friction member;
  a forcible extension mechanism;
    wherein the forcible extension mechanism forcibly extends the first member relative to the second member to bring the wheel frame into contact with the pipeline interior and thereby raise the main frame and the pipeline unit off the pipeline interior to bear a portion of the weight of the pipeline unit; and
    wherein during a rotational positioning, the pipeline unit rotates about a longitudinal axis of the pipeline.

2. The pipeline unit of claim 1, wherein the first and second low friction members are wheels.

3. The pipeline unit of claim 1, wherein the extension member includes a hydraulic or pneumatic piston and a cylinder.

4. The pipeline unit of claim 1, wherein the first and second low friction members include a wheel and the wheel includes a wheel frame, the wheel frame includes two frame plates positioned on either side longitudinally of the wheel.

5. The pipeline unit of claim 4, wherein a wheel is a plurality of wheels supported by the two frame plates and the plurality of wheels form an arcuate positioning to conform with a pipeline interior.

6. The pipeline unit of claim 1, wherein the pipeline unit includes pipeline welding or pipeline inspection equipment.

7. The pipeline unit of claim 2, wherein a wheel is a plurality of wheels.

8. The pipeline unit of claim 2, wherein the wheel includes a rotational axis, the axis being generally parallel to a longitudinal center line of the unit.

9. In combination, a pipeline unit and a roller system for supporting the rotational repositioning of the pipeline unit within a pipeline against the weight of the pipeline unit, the pipeline unit including a main frame to which its components are secured, the combination comprising:
    a pipeline unit, the pipeline unit including a clamp for engaging an interior surface of the pipeline;
    a roller system including: a first longitudinal wheel for rollingly supporting longitudinal travel of the pipeline unit within the pipeline and a second rotational wheel including a rotational axis, the axis being generally parallel to a longitudinal center line of the unit; a wheel frame supporting the second rotational wheel and allowing the wheel to rotate about the axis;
  an extension member including a first member connected to the main frame and a second member connected to the wheel frame;
    a forcible extension mechanism;
    wherein the forcible extension mechanism forcibly extends the first member relative to the second member to bring the wheel frame into contact with the pipeline interior and thereby raise the main frame and the pipeline unit off the pipeline interior to bear a portion of the weight of the pipeline unit.

10. The combination of claim 9, wherein the extension member includes a piston and a cylinder.

11. The combination of claim 10, wherein the wheel frame includes two frame plates positioned on either side longitudinally of the wheel.

12. The combination of claim 11, wherein a wheel is a plurality of wheels supported by the two frame plates.

13. The combination of claim 12, wherein the plurality of wheels forms an arcuate positioning to conform with a pipeline interior.

14. The combination of claim 12, wherein a wheel is a plurality of wheels.

15. The combination of claim 10, wherein the forcible extension mechanism is hydraulically or pneumatically driven.

16. The combination of claim 9, further including a fluid supply and a fluid controller for selectively delivering fluid from the fluid supply to the extension member.

17. The pipeline unit of claim 2, wherein the forcible extension mechanism is screw driven.

18. The combination of claim 9, wherein the pipeline unit is one of an inspection unit, a welding unit, and a welding and inspection unit.

19. A method of rotationally repositioning a pipeline unit comprising the steps of:
    providing a roller system for supporting the rotational repositioning of a pipeline unit against the weight of the pipeline unit, the pipeline unit including a main frame to which its components are secured;
    providing a wheel including a rotational axis, the axis being generally parallel to a longitudinal center line of the unit;
    providing a wheel frame supporting the wheel and allowing the wheel to rotate about the axis;
    providing a extension member including a first member connected to the main frame and a second member connected to the wheel frame;
    selectively extending the first member relative to the second member to cause the pipeline unit to be raised off the pipeline interior surface;
    providing an elongate member that extends radially from the pipeline unit;

applying a rotational force to a lever until the pipeline unit rotates about the longitudinal centerline.

20. The method of claim 19, further providing the step of providing an opening in the pipeline unit, and the step of securing a first end of the elongate member in the opening.

* * * * *